(12) United States Patent
Fang

(10) Patent No.: US 11,363,232 B2
(45) Date of Patent: *Jun. 14, 2022

(54) SYSTEM AND CIRCUIT FOR DISPLAY POWER STATE CONTROL

(71) Applicant: Enseo, LLC, Plano, TX (US)

(72) Inventor: William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,478

(22) Filed: Oct. 12, 2021

(65) Prior Publication Data

US 2022/0030304 A1 Jan. 27, 2022

Related U.S. Application Data

(63) Continuation of application No. 17/102,789, filed on Nov. 24, 2020, now Pat. No. 11,146,754, which is a continuation of application No. 16/458,485, filed on Jul. 1, 2019, now Pat. No. 10,848,706, which is a continuation-in-part of application No. 15/824,645, filed on Nov. 28, 2017, now Pat. No. 10,142,582, which is a continuation of application No. 15/436,500, filed on Feb. 17, 2017, now Pat. No. 9,832,414, which is a continuation of application No. 14/868,997, filed on Sep. 29, 2015, now abandoned, which is a continuation of application No. 13/171,190, filed on Jun. 28, 2011, now Pat. No. 9,148,697.

(Continued)

(51) Int. Cl.
*H04N 5/63* (2006.01)
*H04N 21/436* (2011.01)
*H04N 21/443* (2011.01)

(52) U.S. Cl.
CPC ......... *H04N 5/63* (2013.01); *H04N 21/43615* (2013.01); *H04N 21/4432* (2013.01)

(58) Field of Classification Search
CPC ......... H04N 21/43615; H04N 21/4432; H04N 21/4436; H04N 5/63
See application file for complete search history.

(56) References Cited

U.S. PATENT DOCUMENTS 3,811,090 A * 5/1974 Uchida ............... H04N 5/63
348/730
4,331,977 A * 5/1982 Cohn ................. H04N 5/63
348/730

(Continued)

*Primary Examiner* — Michael B. Pierorazio
(74) *Attorney, Agent, or Firm* — Scott Griggs; Griggs Bergen LLP

(57) ABSTRACT

A system and circuit for television power state control are disclosed. In one embodiment, a power management circuit communicatively controls television or set-top box components including a signal processing circuitry, a screen, and a visual indicator. The power management circuit selectively alternates the television between three states: powered ON/operating state (first state); power standby state (second state); and no/low power state (third state). Utilized with a television in a commercial or residential application, the system and circuit are employed to provide accelerated turn-on time to receive an image for user interaction, while providing sufficient control to maintain energy power savings.

17 Claims, 3 Drawing Sheets

Related U.S. Application Data

(60) Provisional application No. 62/692,972, filed on Jul. 2, 2018, provisional application No. 61/359,251, filed on Jun. 28, 2010.

(56) References Cited

U.S. PATENT DOCUMENTS

| | | | |
|---|---|---|---|
| 4,439,784 A * | 3/1984 | Furukawa | H04N 7/17363 725/38 |
| 4,951,309 A | 8/1990 | Gross et al. | |
| 5,475,364 A * | 12/1995 | Kenet | G08B 19/005 340/567 |
| 5,519,506 A | 5/1996 | D'Avello et al. | |
| 6,002,380 A * | 12/1999 | Lee | H04N 3/22 345/13 |
| 6,004,616 A | 12/1999 | Kitamura | |
| 6,076,169 A * | 6/2000 | Lee | G06F 1/3215 713/320 |
| 6,205,318 B1 * | 3/2001 | Schindler | H04N 21/43615 348/E5.103 |
| 6,259,486 B1 * | 7/2001 | Mahvi | H04N 5/44 348/730 |
| 6,407,840 B1 | 6/2002 | Shien-Te et al. | |
| 7,411,631 B1 * | 8/2008 | Joshi | G06F 1/3203 348/730 |
| 7,730,507 B2 * | 6/2010 | Sakai | H04N 5/63 348/730 |
| 8,004,616 B2 * | 8/2011 | Kitamura | H04N 5/63 348/730 |
| 9,148,697 B2 * | 9/2015 | Johns | H04N 21/43615 |
| 9,832,414 B2 * | 11/2017 | Fang | H04N 21/43615 |
| 10,142,582 B2 * | 11/2018 | Fang | H04N 5/63 |
| 10,848,706 B2 * | 11/2020 | Fang | H04N 5/63 |
| 11,146,754 B2 | 10/2021 | Fang | |
| 2005/0132420 A1 * | 6/2005 | Howard | G06F 3/017 348/E5.103 |
| 2005/0243081 A1 * | 11/2005 | Cha | H02M 1/15 345/212 |
| 2006/0140452 A1 * | 6/2006 | Raynor | G06F 1/3203 382/115 |
| 2007/0152994 A1 * | 7/2007 | Koh | G09G 5/006 348/E5.127 |
| 2008/0270814 A1 | 10/2008 | Starr et al. | |
| 2009/0010671 A1 * | 1/2009 | Hashimoto | G06F 1/3203 713/300 |
| 2009/0021649 A1 * | 1/2009 | Lee | H04N 5/63 348/730 |
| 2009/0316796 A1 * | 12/2009 | Taleb | H04N 21/4436 375/E7.027 |
| 2010/0196038 A1 * | 8/2010 | Yamaguchi | G03G 15/2039 399/69 |
| 2010/0306558 A1 * | 12/2010 | Kang | G06F 1/3203 713/300 |
| 2011/0179300 A1 * | 7/2011 | Suzuki | G11B 19/00 713/323 |
| 2014/0210754 A1 * | 7/2014 | Ryu | G06F 3/0346 345/173 |
| 2014/0245041 A1 * | 8/2014 | Ayalur | G06F 1/3206 713/323 |
| 2017/0163926 A1 | 6/2017 | Fang | |

* cited by examiner

SYSTEM AND CIRCUIT FOR DISPLAY POWER STATE CONTROL

PRIORITY STATEMENT & CROSS-REFERENCE TO RELATED APPLICATIONS

This application is a continuation of U.S. patent application Ser. No. 17/102,789, entitled "System and Circuit for Display Power State Control" and filed on Nov. 24, 2020 in the name of William C. Fang, now U.S. Pat. No. 11,146,754 issued on Oct. 12, 2021; which is a continuation of U.S. patent application Ser. No. 16/458,485, entitled "System and Circuit for Display Power State Control" and filed on Jul. 1, 2019 in the name of William C. Fang, now U.S. Pat. No. 10,848,706 issued on Nov. 24, 2020; which claims priority from U.S. Patent Application Ser. No. 62/692,972 entitled "System and Circuit for Display Power State Control" and filed on Jul. 2, 2018 in the name of William C. Fang; all of which are hereby incorporated, in entirety, by reference for all purposes. Application Ser. No. 16/458,485 is also a continuation-in-part of U.S. patent application Ser. No. 15/824,645 entitled "System and Circuit for Television Power State Control" and filed on Nov. 28, 2017, in the name of Bill Fang and issued as U.S. Pat. No. 10,142,582 on Nov. 27, 2018; which is a continuation of U.S. patent application Ser. No. 15/436,500 entitled "System and Circuit for Television Power State Control" filed on Feb. 17, 2017, in the name of Bill Fang and issued as U.S. Pat. No. 9,832,414 on Nov. 28, 2017; which is a continuation of U.S. patent application Ser. No. 14/868,997 entitled "System and Circuit for Television Power State Control" filed on Sep. 29, 2015, in the names of Jeff Johns and Bill Fang; which is a continuation of U.S. application Ser. No. 13/171,190 entitled "System and Circuit for Television Power State Control" filed on Jun. 28, 2011, in the name of Jeff Johns and issued as U.S. Pat. No. 9,148,697 on Sep. 29, 2015; which claims priority from U.S. Patent Application Ser. No. 61/359,251, entitled "System and Method for Television Power State Control" and filed on Jun. 28, 2010 filed in the names of Jeff Johns and Bill Fang; all of which are hereby incorporated, in entirety, by reference for all purposes.

TECHNICAL FIELD OF THE INVENTION

This invention relates, in general, to the control of the power state of a television and, in particular, to a system and circuit for facilitating acceleration from no power/low power states to powered ON/operating states.

BACKGROUND OF THE INVENTION

Without limiting the scope of the present invention, its background will be described with reference to power state control in commercial applications, such as hotels. When placing a television in a commercial environment for independent operation by a customer or end-user, television power-on can present significant issues for operation, continuing support, and costs. Typically, televisions in hotels and other guest-serving environments turn ON slowly by charging the system from a stand-by state, where very low power is consumed in order to conserve energy during long periods of inactivity. This power-up from the standby state can take between four (4) and twenty (20) seconds depending on the design of the television. Such a delay results in customer complaints.

SUMMARY OF THE INVENTION

It would be advantageous to achieve power state control in a commercial environment, such as a hotel. It would also be desirable to enable an electrical/programming-based solution that would save power. To better address one or more of these concerns, systems and methods are disclosed for display state power control, including television state power control. In one embodiment, a power management circuit communicatively controls television or set-top box components including a signal processing circuitry, a screen, and a visual indicator. The power management circuit selectively alternates the television between three states: powered ON/operating state (first state); power standby state (second state); and no/low power state (third state). Utilized with a display, such as a television in a commercial or residential application, the system and circuit are employed to provide accelerated turn-on time to receive an image for user interaction, while providing sufficient control to maintain energy power savings.

As alluded, in one implementation, the system and method are utilized in a residential application with a display such as a television to be controlled in a specific manner to provide accelerated turn-on time to receive an image for user interaction, while providing sufficient control to maintain energy power savings. In another implementation, the system and method are utilized with a television in a commercial application that can be controlled in a specific manner to provide accelerated turn-on time to receive an image for user interaction, while providing sufficient control to maintain energy power savings. With respect to the commercial implementation, the resulting controlled system meets key requirements for guests of hotels, as well as other venues, such as medical facilities, stadiums, and other commercial television locations, where a television owned by a facility is provided to a customer end user for operation.

In one embodiment, the system combines the interaction of a user and commercial television for the purpose of self-directed use. Through the combination of components, the display or television can "Turn-on," meaning provide the user with a television that is on and has a picture on the screen, within one (1) second of the pressing of the "power" or "power ON" button on a remote control or front of the television. In this embodiment, through blanking of video, control of image lighting (back-light, LED, side-light or emissive lighting) and modification of the standby indicator state in the television, the desired "Instant On" results can be delivered and controlled for energy savings. Elements inside the television may include a video signal, audio signal, lighting/backlighting, indicator lights and elements of control/interaction may include a user remote control, TV bezel button, external control device or sensors, room entry system, and business/rules logic. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
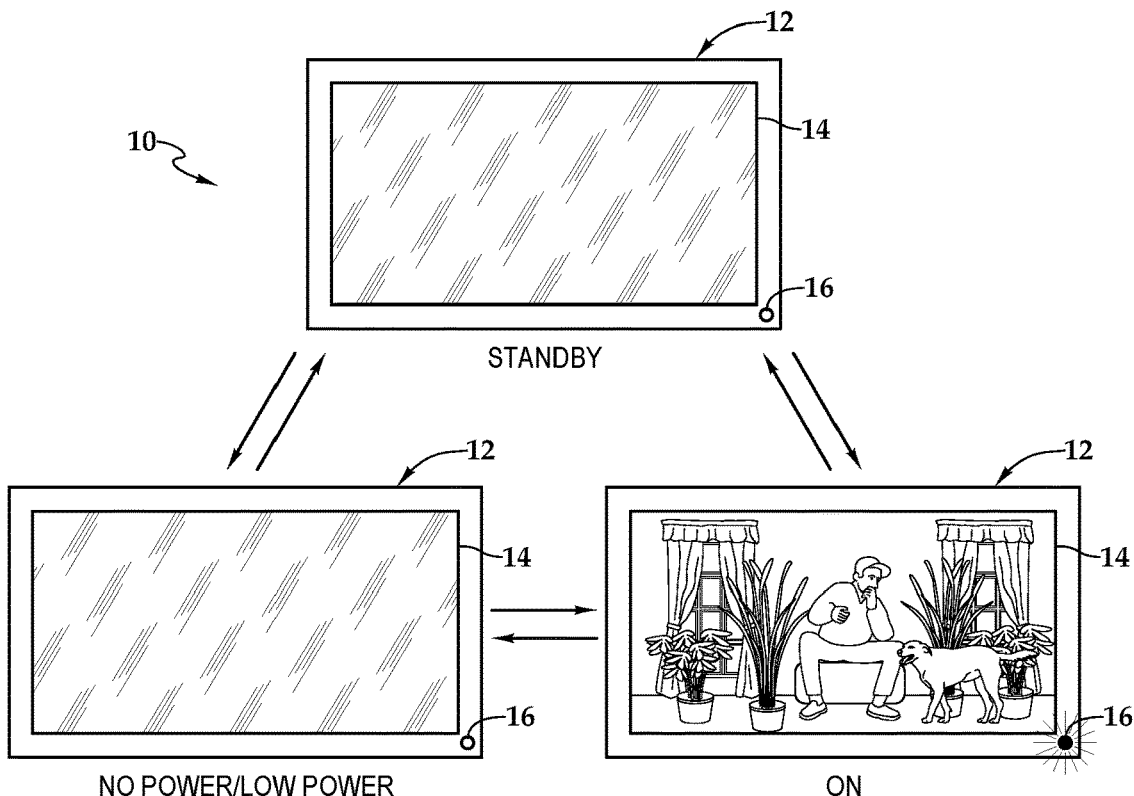
FIG. 1 is a schematic diagram depicting one embodiment of the system for television power state control being utilized in conjunction with a television.

Referring initially to FIG. 1, therein is depicted a system for television power control that is schematically illustrated and generally designated 10. A display 12 is illustrated that includes a screen 14 having a visual indicator 16 associated therewith that informs the user of the ON/OFF operational status of the display 12. It should be appreciated however, that the display 12 may be any electronic visual display device or television set, for example. As shown and will be discussed in further details hereinbelow, the system 10 selectively alternates the display 12 between three states: powered ON/operating state (first state); power standby state (second state); and no power/low power state (third state). Utilized with the display 12 in a commercial or residential application, the system 10 and accompanying circuit are employed to provide accelerated turn-on time to receive an image for user interaction, while providing sufficient control to maintain energy power savings.

Figure 2:
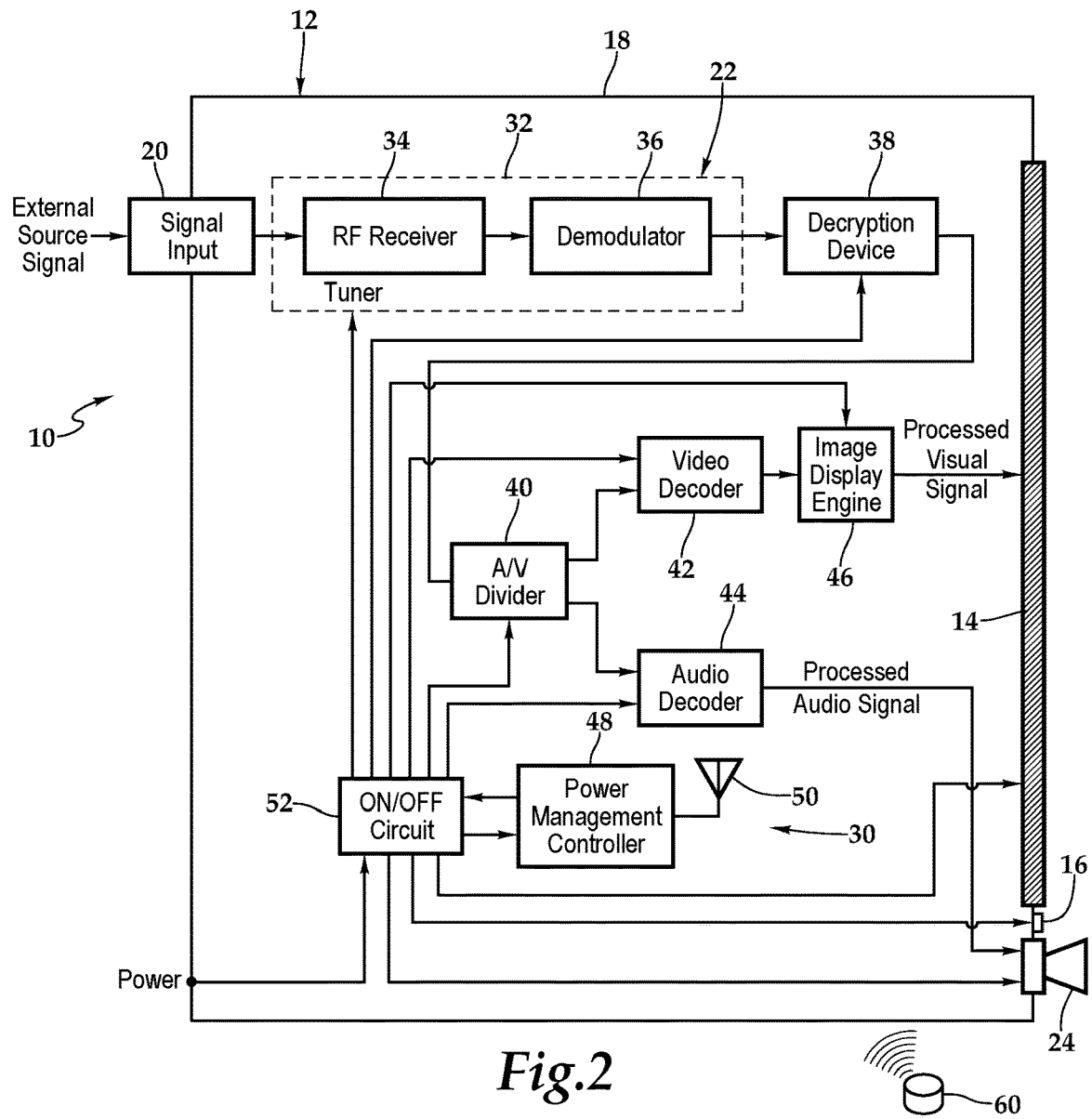
FIG. 2 is a schematic diagram depicting the system in FIG. 1 in further detail.

FIG. 2 depicts one embodiment of the system 10 and display 12 in further detail. With respect to the display 12, within a housing 18, a signal input 20 receives a signal from an outside source. By way of example, the signal input 20 may be a coaxial cable input coupling the display 12 to an external cable source, a category five (Cat 5) cable coupling the display 12 to an external pay-per-view source or an HDMI connection coupling the display 12 to a streaming content source, for example. Signal processing circuitry 22 processes the signal and outputs a processed visual signal to the screen. Analogously, the signal processing circuitry 22 processes the signal and outputs a processed audio signal to a speaker 24. A power management circuit 30 communicatively controls the signal processing circuitry 22, the screen 14, the speaker 24, and the visual indicator 16. The power management circuit 30 selectively alternates the display 12 between powered ON/operating state (first state); power standby state (second state); and no power/low power state (third state).

In one embodiment, the signal processing circuitry 22 includes a tuner 32 that is configured to receive and tune a channel from the external source signal. As shown, the tuner 32 includes a radio frequency (RF) receiver 34 and a demodulator 36 associated with a decryption device 38 and an audio/video divider 40 driving respective video and audio signals to a video decoder 42 and an audio decoder 44 in order to provide a tuned audiovisual channel. The RF receiver 34 is the portion of the tuner 32 that receives RF transmissions and converts the selected carrier frequency and its associated bandwidth into a fixed frequency that is suitable for further processing. The demodulator 36 is an electronic circuit that is used to recover the information content from the modulated carrier wave provided by the RF receiver 34. The decryption device 38 then decrypts the demodulated signal before decoding at respective the video decoder 42 and the audio decoder 44 following the split of the audio and video signals at the audio/video divider 40. It should be appreciated that although a particular architecture of tuner, RF receiver, demodulator, decryption device, visual decoder, and audio decoder is depicted, other architectures are within the teachings presented herein. An image display engine 46 receives the processed signal from the video decoder 42 and processes the signal for backlight luminance, spatial resolution or temporal resolution, for example, depending on the viewing requirements of the screen 14. The processed visual signal is driven from the image display engine 46 to the screen 14.

In one embodiment, the power management circuit 30 includes a power management controller 48 having an antenna 50 associated therewith. The power management circuit 30 also includes an ON/OFF circuit 52, which is coupled to a power source that powers the display 12. The power management controller 48 selectively alternates the display 12 between three states: powered ON/operating state (first state); power standby state (second state); and no power/low power state (third state) via the ON/OFF circuit 52, which distributes power. In the illustrated embodiment, the ON/OFF circuit 52 of the power management circuit 30 is disposed in communication with the screen 14, the visual indicator 16, the signal processing circuitry 22, and the speakers 24. As will be discussed in further details hereinbelow, the power management circuit 30 selectively alternates the television 12 between three states: powered ON/operating state (first state); power standby state (second state); and no power/low power state (third state).

As shown, the antenna 50 is coupled to the power management controller 48 of the power management circuit 30 and configured to receive an activity signal relative to environment activity status. In one implementation of the receiver, the antenna 50 is part of the power management circuit 30 in order to receive a wireless activity signal from a monitoring unit, such as an occupancy sensor 60 or remote, located proximate to the television. Moreover, a portion of the signal received at the signal input 20 may also form a portion of the power management circuit 30 in order to receive activity signals from a networked source, such as the front desk or backend of a hotel or door lock or light switch, in certain commercial environments. In one embodiment, the antenna 50 wirelessly communicates with an occupancy sensor 60, which may be an in-room occupancy sensor co-located in-room with the display 12 or an on-premises occupancy sensor co-located on-premises with the display 12. By way of example, in-room may apply to a living room, bedroom, kitchen, or hotel room where the display 12 is located. By way of further example, on-premises may apply to a home, hotel, or apartment complex where the room having the display 12 is located.

Figure 3:
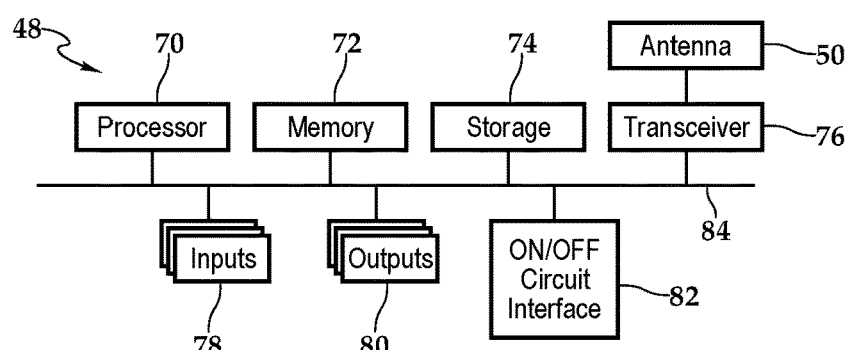
FIG. 3 is a schematic diagram depicting one embodiment of a power management circuit depicted in further detail.

Referring now to FIG. 3, the power management controller 48 may form a portion of the display 12, which may be a television set, or, alternatively, form a portion of a set top/back box. In one embodiment, the power management controller 48, which forms a portion of the power management circuit 30, includes a processor 70, memory 72, storage 74, a wireless transceiver 76, inputs 78, outputs 80, and an ON/OFF circuit interface 82, all interconnected by a bus 84. The processor 70 may process instructions for execution within the computing device, including instructions stored in the memory 72 or in storage 74. The memory 72 stores information within the computing device. In one implementation, the memory 72 is a volatile memory unit or units. In another implementation, the memory 72 is a non-volatile memory unit or units. Storage 74 provides capacity that is capable of providing mass storage for the power management controller 48. Various inputs 82 and outputs 84 provide connections to and from the computing device, wherein the inputs 82 are the signals or data received by the power management controller 48, and the outputs 80 are the signals or data sent from the power management controller 48.

As discussed, the wireless transceiver 76, which may be coupled to the antenna 50, is associated with the power management controller 48 and communicatively disposed with the bus 84. As shown the wireless transceiver 76 may be internal, external, or a combination thereof to the housing 18. Further, the transceiver 76 may be a transmitter/receiver, receiver, or an antenna for example. Communication between various amenities in the room, including hotel room, or the building, including a lodging establishment, and the power management controller 48 may be enabled by a variety of wireless methodologies employed by the transceiver 76, including 802.11, 802.11 a/b/g/n/ac, 3G, 4G, Edge, WiFi, ZigBee, near field communications (NFC), Bluetooth low energy and Bluetooth, for example. Also, infrared (IR) may be utilized.

The memory 72 is accessible to the processor 70 and the memory 72 includes processor-executable instructions that, when executed, cause the processor 70 to selectively alternate between the first state, the second state, and the third state based on received data relative to the environment status e.g., occupancy in the room and desire to watch television. The memory 70 also includes processor-executable instructions that, when executed, cause the processor 70 to receive environmental activity statuses from external sources via wired or wireless connections, for example. The environmental activity statuses may inform the power management circuit of the location of an end user or applicant. By way of example, such an indication may include that an end user or occupant is in-room or on-premises, including checked-in or checked-out in commercial lodging environment applications, or that an end user or occupant has left the room or premises. Various types of in-room or on-premises sensors or a front desk may provide such information. The processor-executable instructions may also cause the processor 70 to process the environmental activity statuses as part of selecting or transitioning from state-to-state.

In the first state, processor-executable instructions cause the processor 70 to drive first signaling to activate the signal processing circuitry 22 on. The first signaling passing the signal from the signal input 20 through the tuner 32 and decryption device 38 to the audio/visual divider 40. The first signaling then drives the divided signal to the video decoder 42 and the audio decoder 44. The first signaling passes the video portion of the divided signal through the image display engine 46 and the processed visual signal is driven to the screen 14. Analogously, the first signaling drives the audio portion of the divided signal through the audio decoder 44 and the processed audio signal is driven to the speaker 24. The first signaling also includes driving the visual indicator 16 to display television ON.

In the second state, processor-executable instructions cause the processor 70 to drive second signaling to activate the signal processing circuitry 22 ON. The second signaling passing the signal from the signal input 20 through the tuner 32 and decryption device 38 to the audio/visual divider 40. The second signaling then drives the divided signal to the video decoder 42 and the audio decoder 44. The second signaling passes the video portion of the divided signal through the image display engine 46 and the processed visual signal is not driven to the screen 14. Rather, the second signaling blanks the processed video signal such that a blank video image is displayed on the screen 14. That is, in one embodiment, the image display engine 46 blanks the video signal, while maintaining synchronization with the image display engine 46. The second signaling also includes blocking the audio signal from the audio feed to the speaker 24 and driving the visual indicator 16 to display television OFF. In the third state, the processor-executable instructions cause the processor 70 to drive third signaling to turn the signal processing circuitry 22 off or place the signal processing circuitry 22 in a low power state. Additionally, in one implementation, when transitioning from the first state to the third state or from the second state to the third state, the processor 70 may decrement a timer or time period. In this implementation, the power state control change is not made until the timer is decremented to zero or a signal is received indicating that the occupant is not returning.

Figure 4:
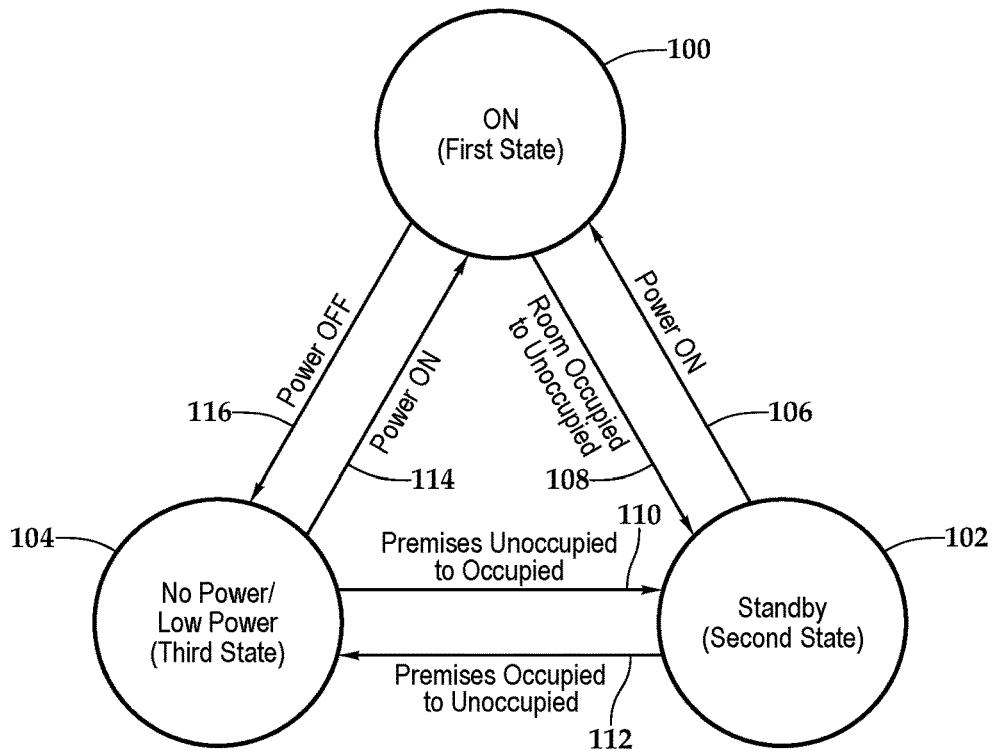
FIG. 4 is a state diagram depicting one embodiment of state transitions and a method for television state power control.

Referring now to FIG. 4, as mentioned, the power management circuit 30 selectively alternates the television between three states: powered ON/operating state (first state 100); power standby state (second state 102); and no power/low power state (third state 104). The powered ON/operating state (first state 100) is optimally consuming power for an occupied television environment and power ON television. The power standby state (second state 102) is optimized for an occupied television environment or soon to be occupied television environment. The no power/low power state (third state 104) is optimized for an unoccupied television environment and power OFF television.

Environment activity statuses 106, 108, 110, 112, 114, 116 are shown as triggers for various power state control transitions. More particularly, in the illustrated embodiment, the power management circuit 30 selectively alternates the display 12 between the first state 100 and the second state 102 based on power ON to the television and the room occupation status as shown by the environment activity statuses 106, 108. In particular, with respect to activity status 108, the power may be OFF when the room is occupied. By way of further explanation, the power management circuit 30 may transition the display 12 from the second state 102 to the first state 100 in response to the end user or occupant activating power ON on the display 12. On the other hand, the power management circuit 30 may transition the display 12 from the first state 100 to the second state 102 in response to the end user or occupant leaving the room, which changes the room occupation status from occupied to unoccupied. In one embodiment, an in-room occupancy sensor 60 co-located in-room with the display 12 may relay the room occupation status of the room.

In one embodiment, the power management circuit 30 selectively transitions between the second state 102 and the third state 104 based on occupancy as shown by the by the environment activity statuses 110, 112. More particularly, if the premises is occupied, then the power management circuit 30 selectively transitions from the third state 104 to the second state 102. On the other hand, if the premises is unoccupied, then the power management circuit 30 selectively transitions from the second state 102 to the third state 104. Such transitions between the second state 102 and the third state 104 may represent an end user or occupant arriving at the premises or leaving the premises. Various sensors or a registration system, including a check-in/check-out system in a commercial lodging environment, may provide this information. The power management circuit 30 selectively transitions between the first state 100 and the third state 104 based on power ON/OFF. With respect to activity status 116, the power may be OFF when the room is unoccupied.

Figure 5:
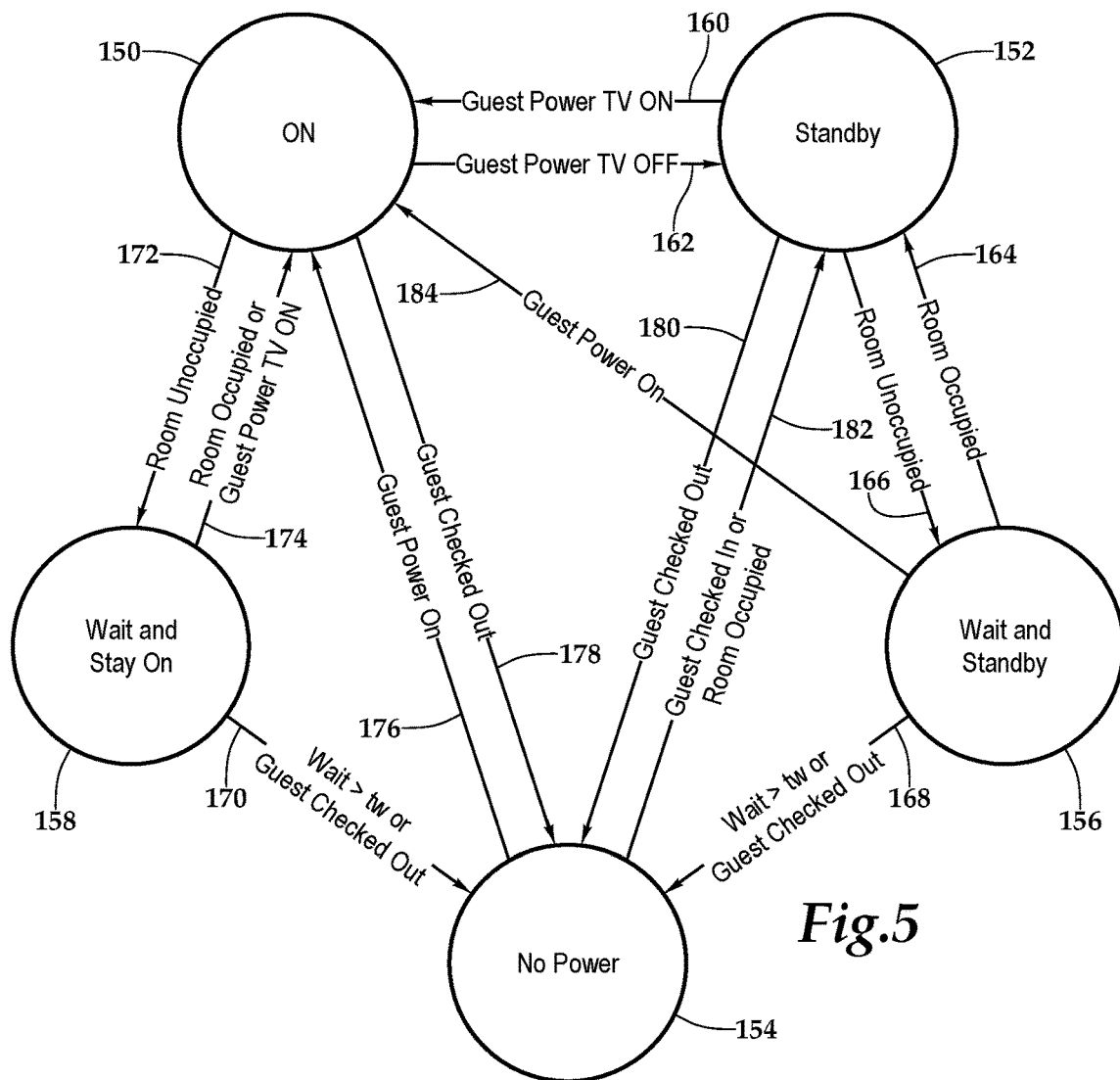
FIG. 5 is a state diagram depicting another embodiment of state transitions and a method for television state power control.

Referring now to FIG. 5, as mentioned, in one embodiment of a commercial lodging environment having a television, the power management circuit 30 selectively alternates the television between three states: powered ON/operating state (first state 150); power standby state (second state 152); and no power/low power state (third state 154). In the first state 150, the power management circuit 30 passes the video signal to the image display engine 46 and, similarly, the power management circuit 30 passes the audio signal to the speaker 24. As shown, the first state 150 includes the visual indicator 16 displaying television ON. The second state 152 includes the power management circuit 30 blanking the video signal to the image display engine 46, while maintaining synchronization with the image display engine 46. Moreover, the power management circuit 30 blocks the audio signal to the speaker 24. The second state 152 includes the visual indicator 16 displaying television OFF. The third state 54 includes the power management circuit 30 turning both the video feed and audio feed OFF. Therefore, synchronization between the video feed and the television is lost. The third state 154 also includes the visual indicator 16 displaying television OFF.

As discussed, the powered ON/operating state (first state 150) is optimally consuming power for an occupied television environment and power ON television. The power standby state (second state 152) is optimized for an occupied television environment and power OFF television, while the no power/low power state (third state 154) is optimized for an unoccupied television environment and power OFF television. In one embodiment, the power management circuit 30 selectively alternates the television between the second state 152 and the third state 154 based on occupancy, between a first state 150 and a second state 152 based on power ON/OFF to the television, and between a first state 150 and a third state 154 based on occupancy and power ON.

Two additional states, which may be considered transitional states, are also shown in FIG. 5. A wait and standby state (fourth state 156) and a wait and stay on state (fifth state 158). The fourth state 156 is respectively located between the second state 152 and third state 154, while the fifth state 158 is positioned between the first state 150 and the third state 154. Environment activity statuses 160-184 are shown as triggers for various power state control transitions.

A guest or other user turning the television ON/OFF by a remote, for example, at statuses 160, 162 may trigger the power control circuit to oscillate between the first state 150 and the second state 152. That is, if the television is ON/operating state (first state 150) and the television is turned OFF, the power control circuit will activate the power standby state (second state 152) and vice versa. If the television is in the power standby state (second state 152) and the television is turned ON, the ON/operating state (first state 150) is activated.

Occupancy may drive the transition from the second state 152 to the third state 154 as shown by environment activity statuses 164-168, which include a transition through the fourth state 156. If the room is unoccupied, as detected by an occupancy sensor 60 or a door key entry/exit and relayed wirelessly or through cabling to the power control circuit, the state transitions from the standby state (second state 152) to the wait and standby state (fourth state 156), where if a time period $t_W$, such as 15 minutes, lapses or the guest checks out, the state progresses to the no power/low power state (third state 154) as shown by the environment activity status 168. If the room is occupied as detected by some monitor, then the state returns to the standby state (second state 152) as shown by the environment activity status 164. Additionally, if a power ON is detected, then the status returns to the ON/operating state (first state 150) as shown by the environment activity status 184.

Transitions between the standby state (second state 152) and the no power/low power state (third state 154) are also enabled by the guest checking in or checking out as shown by the environment activity statuses 180-182. Through a wireless interface or a network, a message may be sent to the power control circuit on the status of the guest, i.e., checking-in or checking-out to change the power status of the television.

With respect to transitions between the power on state (first state 150) and the no power/low power state (third state 154), as shown by environmental activity statuses 176-178, the state may change as a result of the guest checking-in or out. Also, as shown by environmental activity statuses 170-174, the wait and stay on status (fifth state 158) may be transitioned through if the room is detected as unoccupied. If a monitor or other alter informs the power control circuit that the room is no longer occupied, then at wait and stay on status (fifth state 158), if a time period lapses or the guest checks out, then the state is changed to no power state (third state 154).

It should be understood that FIG. 5 is presented with a guest as the occupant in a hotel, however, the teachings presented herein may be used by any occupant in any commercial environment and are applicable to occupants in residential environments too. Moreover, it should be understood that various triggers may activate the system and methods presented herein. By way of example, a non-exhaustive list of triggers and state changes is presented in Table I.

TABLE I

Exemplary Triggers & States

| Trigger | State Triggered |
|---|---|
| Check-in | Second State |
| Check-out | Third State |
| Door Key Entry | Second State |
| Occupant Entry | Second State |
| Occupancy Entry/Exit | Second/Third State |
| Maid/Staff/Maintenance Entry | Second State |
| Room Out-of-Service | Third State |

Figure 6A:
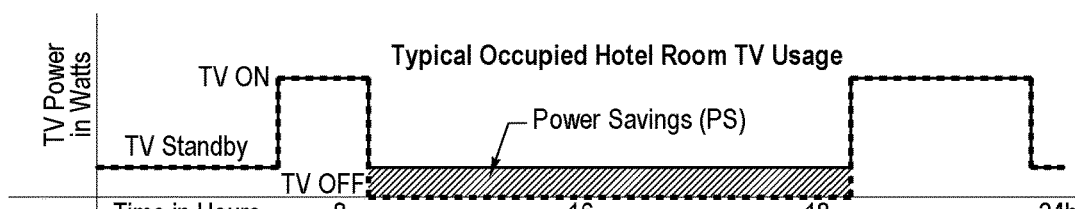
FIG. 6A is a graph of one embodiment of power savings in a typical occupied commercial environment.
Figure 6B:
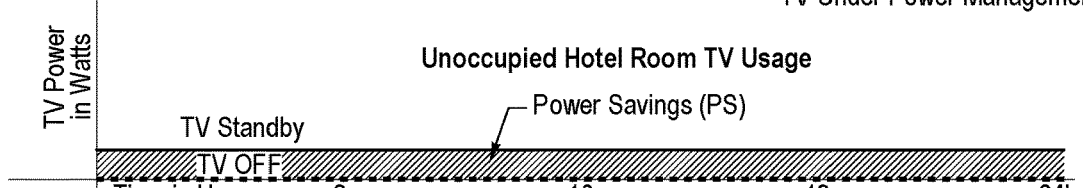
FIG. 6B is a graph of one embodiment of power savings in a typical unoccupied commercial environment, wherein FIGS. 6A and 6B share a common legend.

Referring to FIGS. 6A and 6B, as mentioned, commercial televisions generally require upwards of 20 seconds from the time an end user presses power on a remote or television until a picture is presented for use. The systems and methods presented herein reduce this delay and therefore mitigate resulting guest complaints while maintaining energy savings. FIG. 6A is a graph of typical occupied hotel room television usage, wherein time in hours is graphed against television power in Watts. As shown, a comparison is presented of normal television power consumption and power consumption under the power management presented herein. The resulting power savings (PS) over a twenty-four (24) hour period are indicated by the shading. Similarly, FIG. 6B is a graph of unoccupied hotel room television usage wherein the power savings (PS) over a twenty-four (24) hour period are also shown.

By way of example, when placing a television in a commercial environment for independent operation by a customer or end-user, the system power-on can present significant issues for operation, on-going support and costs. Televisions in hotels and other guest-facing environments that turn on slowly do so by charging the system from a stand-by state where very low power is consumed. This power-up from standby can take between four (4) and twenty (20) seconds depending on the design of the television. The design proposed here uses control and business rules for a turn-on time for the user less than one second, while providing a net savings in energy. Using a device connected to the television, the video source is connected and available for view except that the television is controlled to:

Power off lighting element (if any) to reduce power consumption and eliminate light coming from the TV in this state.

"Blank" video which maintains the synchronization and stream of video through the television yet does not show it on the screen.

Blank" audio which may be coming in from the media source and remains available even without video.

Set user indicators on the television (lights, logos, etc.) to represent the OFF or Standby state.

When the user presses the power button, the state of the items above to:

Power on lighting element (if any) to ON state

Activate video which has maintained synchronization and stream on the screen

Activate audio which associated with the media source
Change user indicators on the television (lights, logos, etc.) to represent the ON state.

The power savings elements when combined with controlled system provides the three aforementioned states:

Full Power Off (using ZERO Watts of Power)

Low Power Stand-by State

Accelerated Power Sequencing State

In one embodiment, the implementation described above can be achieved in a stand-alone function with a television in a commercial environment, yet the power consumption will be increased and in this state a television cannot achieve EnergyStar or other low power consumption rating. To reduce energy consumption, one embodiment includes a control system to use three states of power to provide Accelerated Power Sequencing, while providing a net energy savings. In this modality, an operation cycle is as follows:

Room Not In Service—When a room is not designated for service or operation, the control device provides a Power-Off command to the integrated power source to place the TV in a Full Power Off state. When a room is designated for use, either centrally controlled or by interaction of the entry or monitoring control (i.e., a motion sensor) systems, the control device can activate the television to Full Power Off, Low Power Standby or Accelerated Power Sequencing states.

Room Unoccupied—When a room is not occupied or in operation, the control device provides a Power-Off command to the integrated power source to place the TV in a Full Power Off state. In this state, the TV is consuming no power. For facilities like hotels, a guest room is unoccupied for a significant period of time per day and this FULL OFF state can provide energy savings.

Accelerated Power Sequencing State—When room is designated for use, or control device receives notification of door entry or motion, the control device can activate the Accelerated Power Sequencing State based upon business rules for the operation and energy efficiency.

Using business rules established by the operator, the Accelerated Power Sequencing State is activated upon door entry notification or motion and a timer is activated. If desired, this state can be set without a timer and the television will remain in this state if the room is determined to be occupied. With the timer, if it reaches the pre-set time, the control device would send a command to the television to change to Low-Power Standby State.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A television comprising:
 a power management circuit controlling a signal processing circuitry, a display, and a visual indicator, the signal processing circuitry configured to process a signal received at a signal input and output a processed visual signal to the display, the visual indicator being proximate the display and coupled to the signal processing circuitry, the visual indicator displaying one of display ON and display OFF;
 a first state including the signal processing circuitry ON and the display ON, the first state including the visual indicator displaying display ON;
 a second state including the signal processing circuitry ON, the second state including blanking the processed signal such that a blank video image is displayed on the display, the second state including the visual indicator displaying display OFF;
 a third state including the signal processing circuitry low power, the third state including the visual indicator displaying display OFF, the second state and the third state having identical visual indicators; and
 the power management circuit including non-transitory memory accessible to a processor, the non-transitory memory including first processor-executable instructions that, when executed, by the processor cause the system to:
  alternate the display between the second state and the third state based on premises occupancy status,
  alternate the display between the first state and the third state based on power ON/OFF, and
  alternate the display between the first state and the second state based on the room occupancy and power ON to the display.

2. The television as recited in claim 1, wherein the third state including the power management circuit turning the signal processing circuitry low power further comprises turning the signal processing circuitry OFF.

3. The television as recited in claim 1, further comprising a speaker coupled to the signal processing circuitry, the signal processing circuitry being configured to process the signal and output a processed audio signal to the speaker.

4. The television as recited in claim 3, wherein the first state further comprises activating the speaker ON.

5. The television as recited in claim 3, wherein the second state further comprises turning the speaker OFF.

6. The television as recited in claim 3, wherein the third state further comprises turning the speaker OFF.

7. The television as recited in claim 1, further comprising a wireless transceiver coupled to the signal processing circuitry.

8. The television as recited in claim 7, wherein the wireless transceiver is disposed in wireless communication with an in-room occupancy sensor co-located in-room with the system for display state power control.

9. The television as recited in claim 1, wherein the signal processing circuitry further comprises a tuner, a video decoder, and an image display engine.

10. The television as recited in claim 9, wherein the first state further comprises activating the tuner, the video decoder, and the image display ON.

11. The television as recited in claim 9, wherein the second state further comprises activating the tuner, the video decoder, and the image display engine ON.

12. The television as recited in claim 9, wherein the third state further comprises turning the tuner, the video decoder, and the image display OFF.

13. The television as recited in claim 1, wherein the signal processing circuitry further comprises a tuner and an audio decoder.

14. The television as recited in claim 13, wherein the first state further comprises activating the tuner and the audio decoder ON, the second state further comprises activating the tuner and the audio decoder ON, and the third state further comprises turning the tuner and the audio decoder OFF.

15. The television as recited in claim 1, wherein building occupancy further comprises check-in/check-out of a commercial lodging environment.

16. A television comprising:
- a power management circuit controlling a signal processing circuitry, a display, and a visual indicator, the signal processing circuitry configured to process a signal received at a signal input and output a processed visual signal to the display, the visual indicator being proximate the display and coupled to the signal processing circuitry, the visual indicator displaying one of display ON and display OFF;
- a first state including the signal processing circuitry ON and the display ON, and the speaker ON, the first state including the visual indicator displaying display ON;
- a second state including the signal processing circuitry ON, the second state including blanking the processed signal such that a blank video image is displayed on the display, and the speaker OFF, the second state including the visual indicator displaying display OFF;
- a third state including the signal processing circuitry low power, and the speaker OFF, the third state including the visual indicator displaying display OFF, the second state and the third state having identical visual indicators; and
- the power management circuit including non-transitory memory accessible to a processor, the non-transitory memory including first processor-executable instructions that, when executed, by the processor cause the system to:
  - alternate the display between the second state and the third state based on premises occupancy status,
  - alternate the display between the first state and the third state based on power ON/OFF, and
  - alternate the display between the first state and the second state based on the room occupancy and power ON to the display.

17. A television comprising:
- a power management circuit controlling a signal processing circuitry, a display, and a visual indicator, the signal processing circuitry configured to process a signal received at a signal input and output a processed visual signal to the display, the visual indicator being proximate the display and coupled to the signal processing circuitry, the visual indicator displaying one of display ON and display OFF;
- a first state including the signal processing circuitry ON and the display ON, and the speaker ON, the first state including the visual indicator displaying display ON;
- a second state including the signal processing circuitry ON, the second state including blanking the processed signal such that a blank video image is displayed on the display, and the speaker OFF, the second state including the visual indicator displaying display OFF;
- a third state including the signal processing circuitry low power, and the speaker OFF, the third state including the visual indicator displaying display OFF, the second state and the third state having identical visual indicators; and
- the power management circuit including non-transitory memory accessible to a processor, the non-transitory memory including first processor-executable instructions that, when executed, by the processor cause the system to:
  - alternate the display between the second state and the third state based on premises occupancy status,
  - alternate the display between the first state and the third state based on power ON/OFF, and
  - alternate the display between the first state and the second state based on the guest room occupancy and power ON to the display.

* * * * *